United States Patent [19]
Johnson

[11] Patent Number: 5,586,850
[45] Date of Patent: Dec. 24, 1996

[54] TRUCK BED CARGO DIVIDER

[76] Inventor: James H. Johnson, Rte. 1, Box 276-1, Ore City, Tex. 75683

[21] Appl. No.: 524,946

[22] Filed: Sep. 11, 1995

[51] Int. Cl.$^6$ ...................................................... B60P 7/14
[52] U.S. Cl. .......................... 410/138; 410/129; 410/130; 410/133; 410/137; 410/139
[58] Field of Search ..................................... 410/130, 132, 410/133, 134, 129, 137, 138, 139, 141, 142; 296/37.6; 220/534, 542–546, 549, 550

[56] References Cited

U.S. PATENT DOCUMENTS

| | | | |
|---|---|---|---|
| 2,227,807 | 1/1941 | Dixon | 410/132 |
| 2,911,925 | 11/1959 | Adler et al. | 410/132 X |
| 3,005,419 | 10/1961 | Loomis et al. | 410/137 X |
| 4,722,646 | 2/1988 | McIntyre | 410/138 |
| 4,733,899 | 3/1988 | Keys . | |
| 4,834,599 | 5/1989 | Gordon et al. | 410/151 |
| 4,917,429 | 4/1990 | Giger . | |
| 5,207,472 | 5/1993 | Gower . | |
| 5,265,993 | 11/1993 | Wayne | 410/129 |
| 5,411,355 | 5/1995 | Gasnell et al. | 410/139 |
| 5,427,486 | 6/1995 | Green | 410/129 X |

*Primary Examiner*—Karen B. Merritt
*Assistant Examiner*—Stephen Gordon
*Attorney, Agent, or Firm*—David L. Baker; Henry S. Miller; Rhodes & Ascolillo

[57] ABSTRACT

The invention consists of a panel having an area that is substantially the same dimension as the tail gate on a pickup truck cargo body. The panel is suspended from a track mounted on the body side rails, and through a wheel assembly rides the length of the truck bed. Cut out areas allow the panel to move past the wheel wells and doors attached to the panel are adapted to close off the cut out areas when not obstructed by the wheel wells. Locking bolts on each side engage slots in the side rails and slots in a floor mounted track. A single handle on each side controls the movement of the vertical and horizontal locking bolts.

2 Claims, 5 Drawing Sheets

U.S. Patent   Dec. 24, 1996   Sheet 1 of 5   5,586,850
FIG. 1
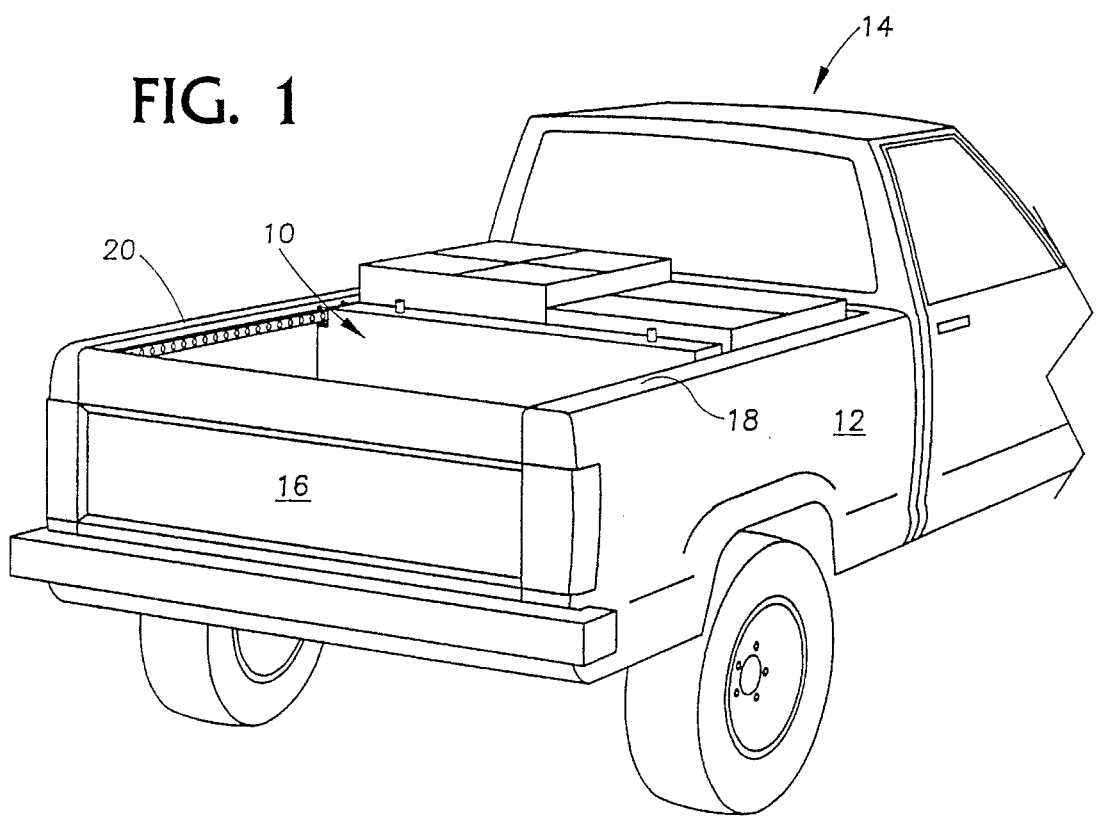
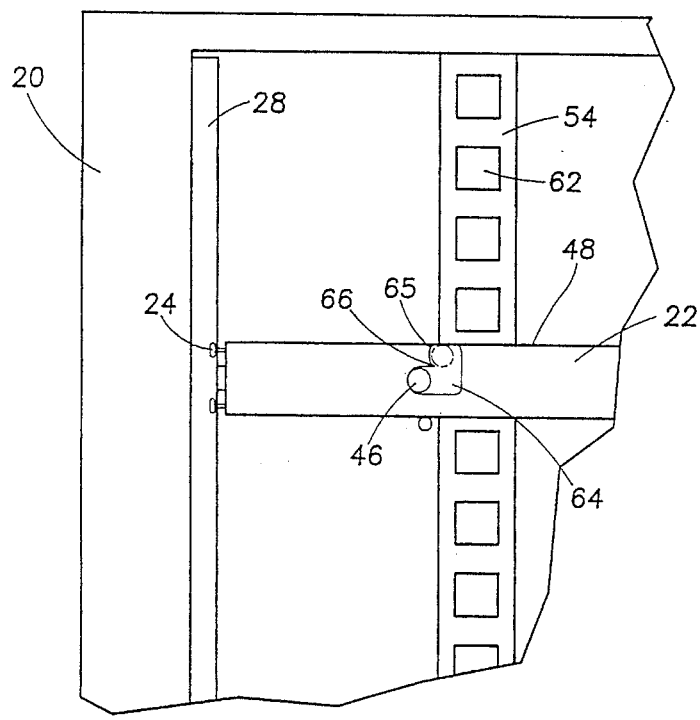
FIG. 10

TRUCK BED CARGO DIVIDER

BACKGROUND OF THE INVENTION

1. Field of the invention

This invention relates generally to the cargo bed of pickup trucks and in particular to a means for dividing the cargo bed into one or more areas adjustable in size.

2. Description of the problem and relevant prior art

The current increase in the utilization of the pickup truck as a means of transportation also sees the vehicle used for non commercial uses. Where the pickup truck with its eight foot standard bed was designed with the idea of transporting sand, bags of cement, shovels, lumber and other equipment now we see more often the cargo bed loaded with bags of groceries, bicycles and garden tools. One complaint of the truck bed is that for many domestic uses it is too large. Bags of groceries fail over and the contents slide and roll around the inside of the bed. Bicycles, tricycles and little red wagons slide and roll around the inside of the bed, slamming against the front panel upon braking and the tailgate upon acceleration.

There is a need for a simple, easily adjustable apparatus that is compatible with a truck bed and which will allow the size of the bed to be varied to fit the size of the cargo transported.

Devices and systems have been suggested to provide variations and compartmentalization of the cargo compartment of a pickup truck but none are continuously variable and as easy to operate as the invention disclosed and claimed herein. U.S. Patents showing examples of prior art attempts to solve the problem include: U.S. Pat. No. 4,733,899 issued Mar. 29, 1988 to Keys for a pickup truck cargo bed divider that includes a vertical baffle that abuts the wheel well projecting into the wheel well facing either forward or aft of the rear axle, changing the size of the cargo area; U.S. Pat. No. 4,834,599 issued May 30, 1989 to Gordon et al. for a truck bed divider which consists of two arm members extending axially from a connector and contain a suction cup at each end which engages the inner sidewall of the truck bed and thereby restrains the cargo; U.S. Pat. No. 4,917,429 issued Apr. 17, 1990 to Giger for a truck bed divider assembly which shows a series of panels forming in the manner of an egg carton divider; U.S. Pat. No. 5,207,472 issued May 4, 1993 to Gower for a one piece truck bed liner including channels to support dividing means, and U.S. Pat. No. 5,265,993 issued Nov. 30, 1993 to Wayne for a truck bed divider system that includes a system of panels connected to the walls of the truck bed and each other by brackets and cooperative hooks.

The references taken alone or in combination fail to anticipate the invention disclose herein.

SUMMARY OF THE INVENTION

The invention is primarily characterized by a panel that is suspended from a pair of tracks by rollers between the sidewalls of the truck bed. Each track contains a series of slots that cooperate with a locking mechanism attached to the panel allowing the panel to be locked in any desired position between the front panel and the tailgate of the cargo body. A second track is positioned on the floor of the truck bed and contain a series of slots coordinated with the slots in the side rail tracks. The locking mechanism includes movable bolts that engage the slots and lock the panel in position over the floor. In addition the panel contains hinged doors that correspond to the interiorly projecting wheel wells and open to allow the panel to move fore and aft without interference. Once past the wheel wells the doors are closed thereby allowing the panel to contain small items that could otherwise escape the restraint of the panel.

Each side rail locking mechanism consists of an upper bolt that is biased into a slot in the side rail track. When the bolt is moved away from the track it is capable of rotation which activates a rod connected to the bolt engaging the bed track and lifts the bed track bed bolt out of its slot and freeing the panel to move on the rollers engaging the side rail track. Also included in the locking mechanism is a recessed area that will secure the upper bolt handle in the out or unlocked position thereby allowing the panel to be moved without requiring the user to apply a continuing force to the handles while moving the panel.

Wheel well bypass doors are hinged to the panel and held in place by a vertical sliding bolt that is attached to the panel face.

It is therefore an object of the invention to provide a new and improved truck bed cargo divider.

It is another object of the invention to provide a new and improved truck bed cargo divider that allows the size of the truck cargo compartment to be continuously varied along longitudinal axis.

It is a further object of the invention to provide a new and improved truck bed cargo divider that is simple to operate.

It is still another object of the invention to provide a new and improved truck bed cargo divider that is a substantial improvement over similar known prior art cargo dividers.

it is still a further object of the invention to provide a new and improved truck bed cargo divider which may be easily and efficiently manufactured and marketed.

it is another object of the invention to provide a new and improved truck bed cargo divider which is of a durable and reliable construction.

These, together with other objects of the invention, along with the various features of novelty which characterize the invention are pointed out with particularity in the claims annexed to and forming a part of this disclosure. For a better understanding of the invention, its operation advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an environmental view of the invention in a truck bed.

FIG. 10 is a top plan view of the invention showing the invention forward of the wheel well.

DETAILED DESCRIPTION OF A PREFERRED EMBODIMENT

Referring now to FIG. 1, the invention is shown generally at 10, positioned transversely in the cargo body 12 of a conventional pickup truck shown generally at 14. The cargo body includes a tail gate 16, which may be removed with the use of the invention, and side rails 18 and 20.

Figure 2:
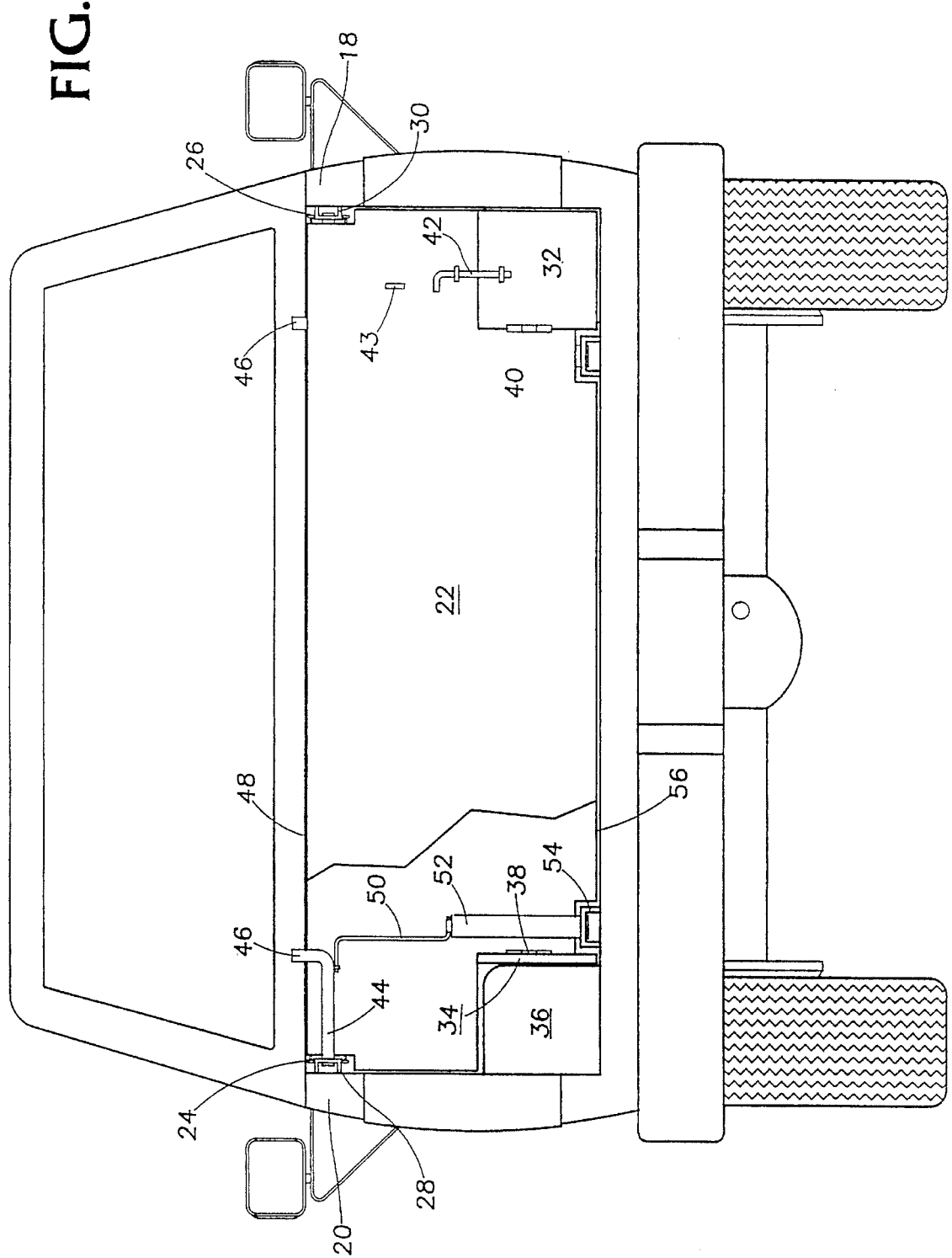
FIG. 2 is a view of the invention from the rear and partly in section.

FIG. 2 shows the cargo bed with the tail gate removed. The invention consists of a panel 22 suspended between the side rails 18,20 by a roller system 24,26 operatively associated with tracks 28 and 30 mounted on the side rails. The tracks run the full length of the cargo bed. To allow panel 22 to translate the entire length of the cargo bed, clearance openings are provided to allow the panel to move beyond the wheel well shown as 36, which is necessary to provide body clearance for the truck tires. The clearance openings are provided with doors 32, 34 which are hinged to the panel at 38 and 40. Vertical sliding bolt locks 42 secure the doors in the closed position. A hanger 43 is engaged by the bolt handle in the raised position securing it out of the way when the panel is locked in the area of the wheel well.

The positioning of the panel 22 is controlled by locking mechanisms which function in the same manner and are located principally along each side of the panel member. Showing for example a left side lock mechanism, with the panel face removed, a horizontal locking bolt 44 is positioned to engage a selected slot in the track 28 which is provided with a series of slots running the entire length of the track. Bolt 44 has an upturned handle 46 which extends beyond the edge 48 of the panel 22. A rod 50 is connected between the horizontal locking bolt 44 and a vertical locking bolt 52 which is engaged in a locking track 54 attached to the floor 56 of the cargo bed 12. The rod 50 also acts as a bias force which acts to drive the horizontal bolt 44 into engagement with a slot in the track 28. Rotation of the handle 46 will raise the vertical bolt 52 from the slot in track 54 whereby moving handle 46 toward the centerline of the cargo bed and rotating will unlock both the horizontal and vertical bolts and allow the panel to roll fore and aft on the side rail tracks.

Figure 3:
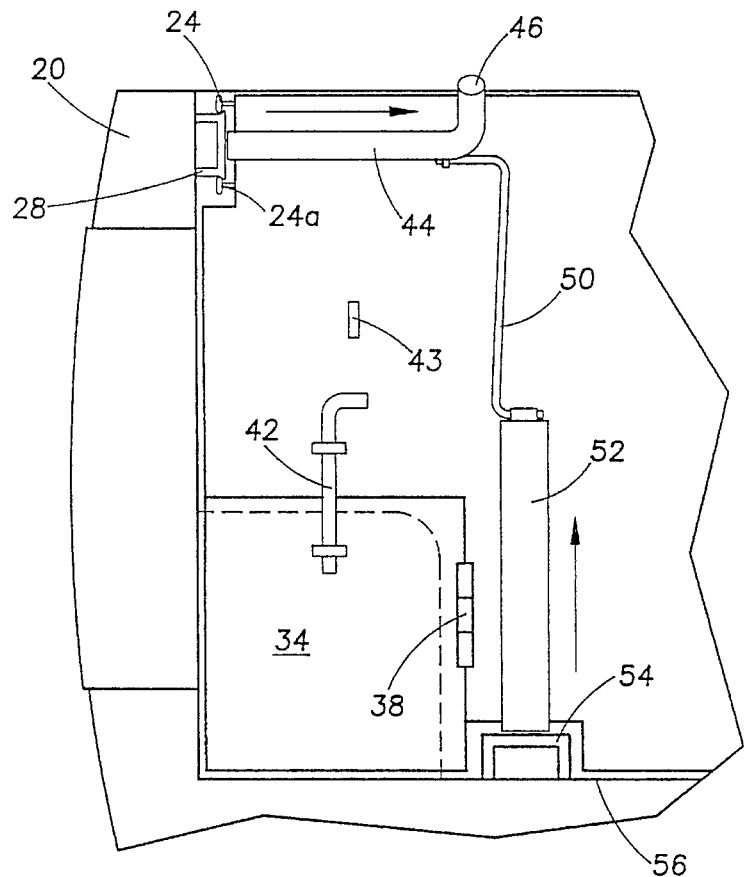
FIG. 3 is an elevation view of the invention in section from the rear with the wheel well door closed.
Figure 4:
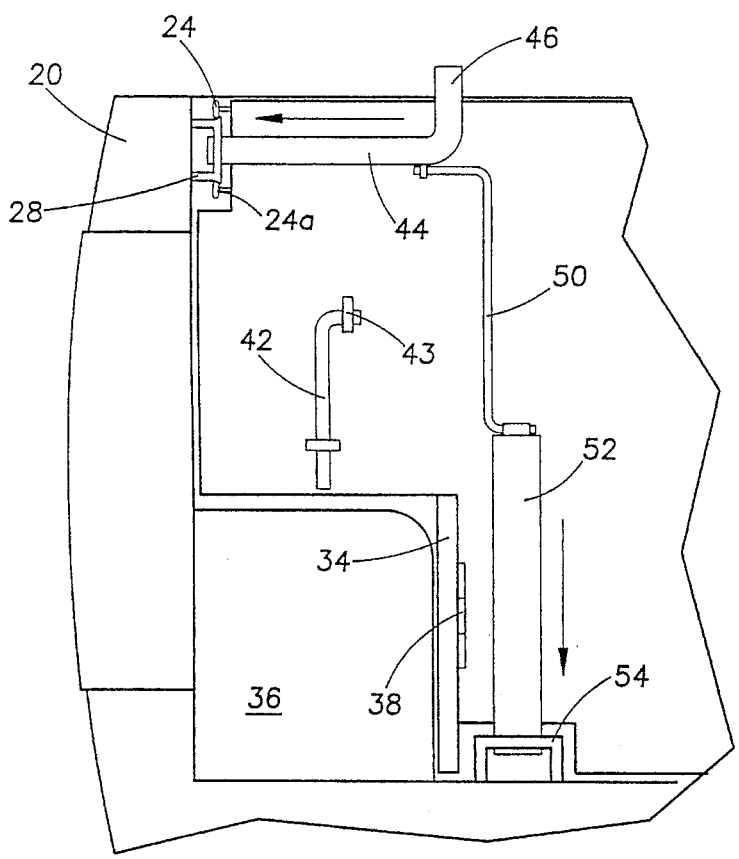
FIG. 4 is an elevation view of the invention in section from the rear with the wheel well door open.

Referring now to FIGS. 3 and 4, FIG. 3 shows the locking mechanism in the unlocked condition. Bolt handle 46 is rotated raising vertical bolt 52 from track 54 and moving bolt 44 away from track 28 as indicated by the directional arrows. As indicated in the drawing, the rod 50 is bending against the movement of the bolt 44 thereby applying a biasing force to encourage the bolt to return to engagement with a slot in the track 28. Door 34 closing the wheel well opening is closed and secured by bolt 42. FIG. 4 shows the locking mechanism in the locked condition with horizontal bolt 44 engaging a slot in the track 28 and vertical bolt 52 engaging a riot in track 54. The door 34 is open and wheel well 36 exposed. Bolt 42 is raised and secured in position by hanger 43.

Figure 5:
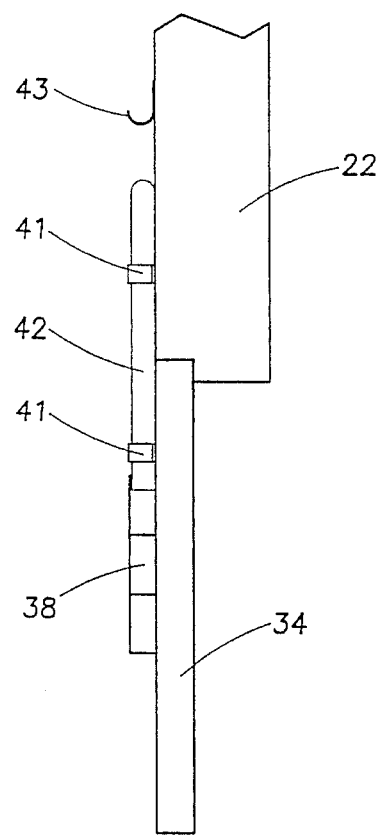
FIG. 5 is a side elevation view of the invention showing the wheel well door and lock.

Concerning FIG. 5, the wheel well door 34 arrangement is shown in greater detail. Panel 22 is shown with some thickness greater than the door 34. Hinge 38 secures the door to panel 22 allowing it to swing out of the way in order to bypass the wheel well as described above. Bolt 42 is mounted by straps 41 and held in the raised position by hanger 43.

Figure 7:
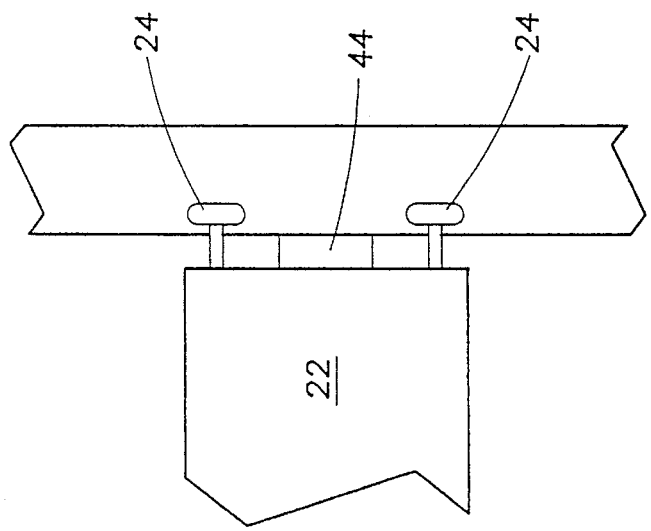
FIG. 7 is a section of the invention showing a top plan view of the side rail track.
Figure 6:
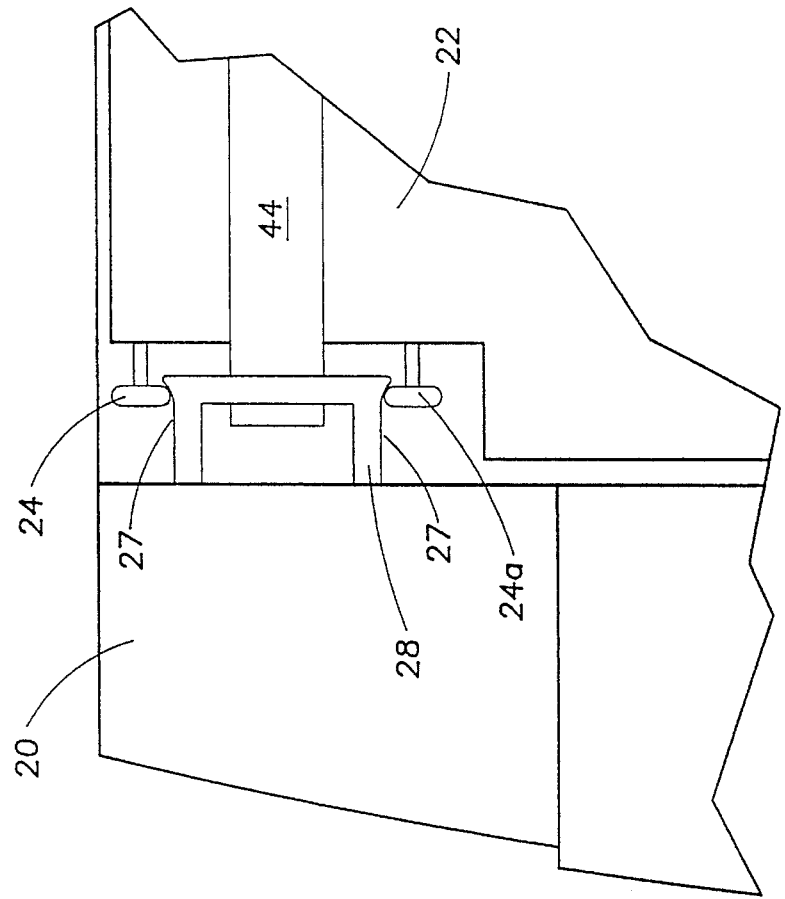
FIG. 6 is a section of the invention showing the end view of the side rail track.

The arrangement of the suspension system is shown in FIGS. 6 and 7. Track 28 which is affixed to the side rail 20 is provided with a identical surfaces 27 upon which support and guide wheels 24 and 24a respectfully ride. The wheel assembly is attached to the panel 22 and includes a pair of superior wheels 24 which support the wight of panel 22 while inferior wheels 24a act a guides and aid in proper alignment of the panel and prevent vertical movement of the panel.

Figure 8:
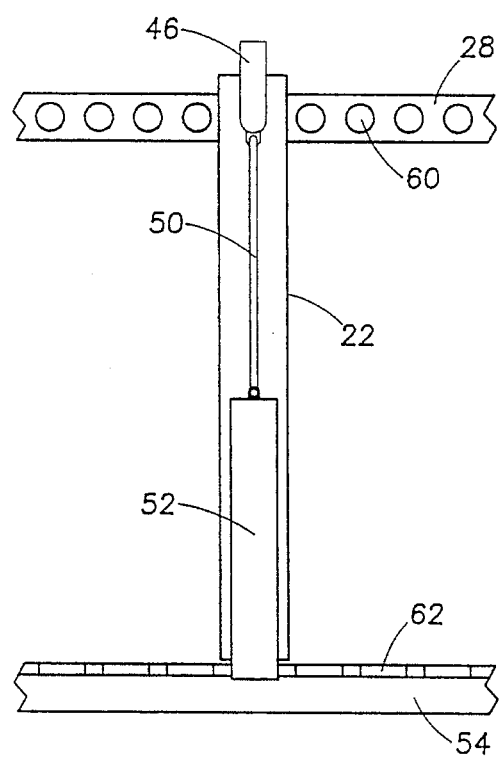
FIG. 8 is a cross sectional view of the invention lock mechanism in the locked condition.
Figure 9:
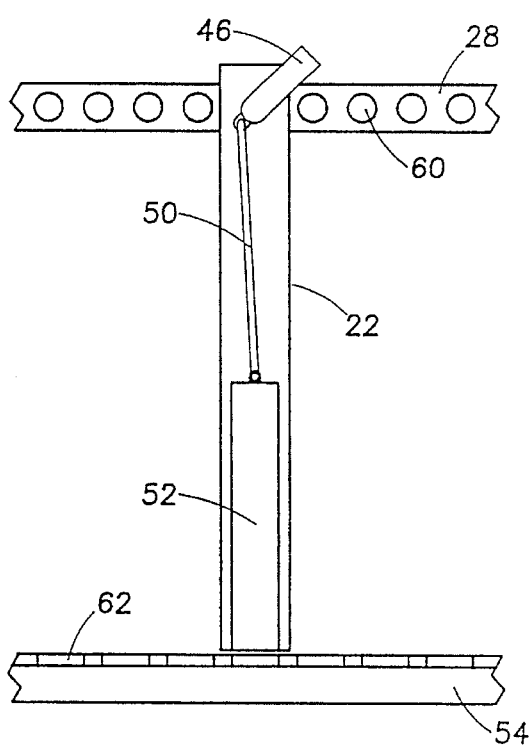
FIG. 9 is a cross sectional view of the invention lock mechanism in the unlocked condition.

Referring to FIGS. 8 and 9, the locking mechanism is shown in FIG. 8 in the locked condition with the horizontal bolt engaged in one of the slots 60 in track 28 and vertical bolt 52 engaged in a slot 62 in the track 54. FIG. 9 shows handle 46 rotated indicating that bolt 44 is withdrawn from the slot 60, rod 50 has raised vertical bolt 52 from a slot 62 in the track 54 and the panel 22 is free to move along the track 28.

Concerning FIG. 10, the top edge 48 of panel 22 is shown containing a restraining recess 64 which acts to hold the horizontal bolt handle 46 in the unlocked position as shown in phantom in the drawing. In operation, handle 46 is pulled against the force created by rod 50 to release the horizontal locking bolt 44. Rotational movement of the handle 46 lifts vertical locking bolt 52 and at this time one side of the panel is movable. When both handles are operated the panel is translatable along the side rails of the cargo bed. The user has a choice of physically holding the handles in the unlocked position or releasing the handles into the region 65 of the restraining recess 64 which will hold the handle in the unlocked position thus allowing the user full use of his hands for other things such as manipulation of the panel. When the panel is in the selected position the user needs to merely apply a small force to move the handle 46 over the lip 66 at the edge of region 65 and the handle is free to return to the locked condition.

In the event it is necessary to remove the panel from the cargo bed the user simply unlocks the panel and moves it to the rear of the cargo bed and off the tracks, installation is the reverse of the removal process.

It should be understood, of course, that the foregoing disclosure relates to only a preferred embodiment of the invention and that numerous modifications or alteration may be made therein without departing from the spirit and scope of the invention as set forth in the appended claims.

What is claimed is:

1. A truck bed cargo divider for a pickup truck comprising:

a cargo bed in the pickup truck;

a floor in the cargo bed;

wheel wells extending into a cargo area defined by the cargo bed;

a panel having a size and dimension approximately equal in size to a dimension of a plane transverse to a longitudinal axis of the cargo bed;

at least two spaced apart sidewalls in the cargo bed;

a first track means for supporting the panel affixed to the side walls of the truck bed;

wheel assembly means attached to the panel and adapted to ride on the track means for allowing translational movement to the panel;

a recess area in the panel on opposed sides for clearance between the panel and each wheel well;

door means attached by hinges to the panel proximate each recess area for closing the recess area;

a second track means affixed to the floor of the truck bed and extending the length of the floor parallel with the longitudinal axis;

lock means mounted in the panel, proximate each track means for controlling movement of the panel along the track means within the truck bed cargo area;

the first track means includes a continuous series of slots facing each side edge of the panel;

the second track means includes a continuous series of slots facing a bottom edge of the panel;

the lock means includes a horizontal sliding bolt mounted within the panel on each side for engagement with the slots in the first track means;

the lock means includes a vertical sliding bolt mounted within the panel on each side for engagement with the slots in the second track means;

the horizontal sliding bolt includes an operating handle extending from a top edge of the panel;

the horizontal sliding bolt and the vertical sliding bolt are interconnected;

a connecting rod for connecting the horizontal sliding bolt and the vertical sliding bolt;

the connecting rod biases the horizontal sliding bolt in a locked position; and a recess in the top edge of the panel, on each side, for securing the sliding bolt handle in an unlocked position, whereby movement of the horizontal sliding bolt from a said track slot of the first track means and rotation of the handle will cause the connecting rod to withdraw the vertical sliding bolt and thereby allow the panel to move freely on the first track means.

2. A truck bed cargo divider for a pickup truck as described in claim wherein the slots in the first and second track means are coordinated.

* * * * *